Oct. 31, 1950 — E. K. KARLSSON ET AL — 2,527,823
CONTROL MECHANISM FOR CORN PICKER ELEMENTS
Filed April 20, 1946 — 3 Sheets-Sheet 2

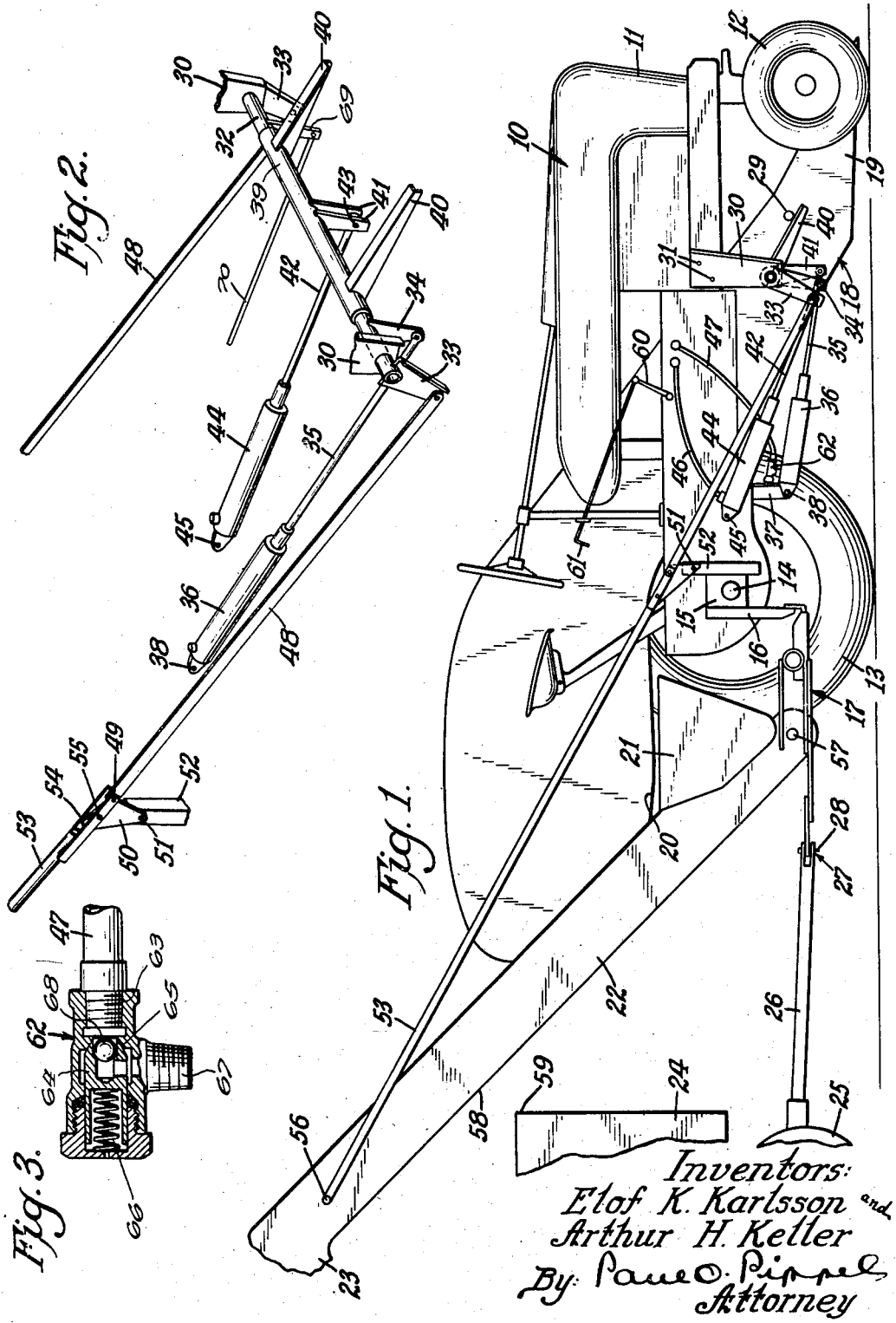

Inventors:
Elof K. Karlsson &
Arthur H. Keller.
By Paul O. Pippel
Atty.

Oct. 31, 1950 E. K. KARLSSON ET AL 2,527,823
CONTROL MECHANISM FOR CORN PICKER ELEMENTS
Filed April 20, 1946 3 Sheets-Sheet 3

Inventors:
Elof K. Karlsson &
Arthur H. Keller
By Paul O. Pippel
Atty.

Patented Oct. 31, 1950

2,527,823

UNITED STATES PATENT OFFICE 2,527,823

CONTROL MECHANISM FOR CORN PICKER ELEMENTS

Elof K. Karlsson, Moline, and Arthur H. Keller, Rock Island, Ill., assignors to International Harvester Company, a corporation of New Jersey Application April 20, 1946, Serial No. 663,674

7 Claims. (Cl. 56—10)

This invention relates to a new and improved harvester in which control mechanism is provided to automatically raise a rearwardly extending wagon elevator simultaneously with the raising of forwardly extending gathering units.

A principal object of this invention relates to a hydraulic control for raising and lowering the gathering points and the wagon elevator of a corn picker.

A further important object of the present invention is to provide a unique hydraulic control for corn picker gathering points and wagon elevator in which the gathering points are raised and the wagon elevator is raised immediately upon the gathering points reaching their uppermost position and the elements are associated with hydraulic means for lowering them in the same order in which they are raised.

A still further important object of the invention is to provide a means for declutching the wagon elevator drive whenever the elevator is raised with respect to the corn picking units.

Corn pickers invariably include gathering units and a wagon elevator. The gathering units are adapted to gather standing rows of corn in the field and either take the whole stalk into the machine or at least take the ears of corn from the stalk and carry them into the corn picker proper. After the stalk is gathered, the ears are snapped therefrom and thence husked at which time these husked ears are delivered to a wagon elevator which carries the corn upwardly and rearwardly to a discharge spout above a trailing wagon. The wagon elevator is relatively flexibly joined to the rear of the corn picker so that upon irregularities in the contour of the earth's surface or during turning of corners by the corn picker causing the fore part of the wagon to strike the elevator, the wagon elevator will be able to yield upwardly and forwardly. When the trailing wagon does strike the wagon elevator, it quite often causes considerable damage to the elevator. It has been necessary to reenforce elevators over the area of possible wagon contact to such a degree that the cost of manufacture is unduly increased. When the corn picker traverses a ditch the operator must necessarily raise the gathering points or else cause them to be imbedded in the far side of such a ditch. After raising the gathering points the corn picking machine will pass over the ditch, but during the last portion of ditch travel the rear part of the machine will fall downwardly causing the wagon elevator to strike the front of the trailing wagon. This same situation occurs when the corn picking machine is turning a corner against or over ridges and furrows caused by plowing and cultivation in one direction. The result is that the machine acts similarly to that when it passes over a ditch. It is, therefore, a very important object of this invention to provide a means for automatically causing the wagon elevator to be raised free from possible contact with a trailing wagon immediately after the gathering points of the picking machine have been raised. This insures that the wagon elevator will be saved considerable abuse by striking the upper edge of the front wall of a trailing wagon. Of course, separate controls could be provided so that the operator of the corn picker could raise the wagon elevator separately from his controls for raising the gathering points. However, the operator does not see the danger of permitting the wagon elevator to remain in a down position at least to the same degree he sees the danger of leaving the gathering points in a down position. In other words, the danger is proximate for the gathering points and only remote for the wagon elevator. In addition, the lowering of the gathering points should be complete before the wagon elevator is lowered and its clutch reengaged. The purpose of having the points lowered prior to the lowering of the elevator is discovered when the machine is turning the corner at the end of a row. At that time the points enter the new row when the elevator or rear end of the implement is still angled off to one side. If elevator operation were to resume at this point we would begin depositing the harvested crop on the ground to one side of the trailing wagon. Hence the lowering of the elements in proper successive order is also accomplished by hydraulic means.

Other and further important objects will become apparent from the disclosures in the following specification and accompanying drawing in which:

Figure 1 is a side elevational view of the corn picker of this invention with parts removed and broken away for clarity of operation;

Figure 2 is a perspective view of the hydraulic controls for the corn picker gathering points and wagon elevator of this invention;

Figure 3 is a sectional detail of the pressure releasing valve used in the corn picker hydraulic unit of this invention;

As shown in the drawings:

Figure 4:
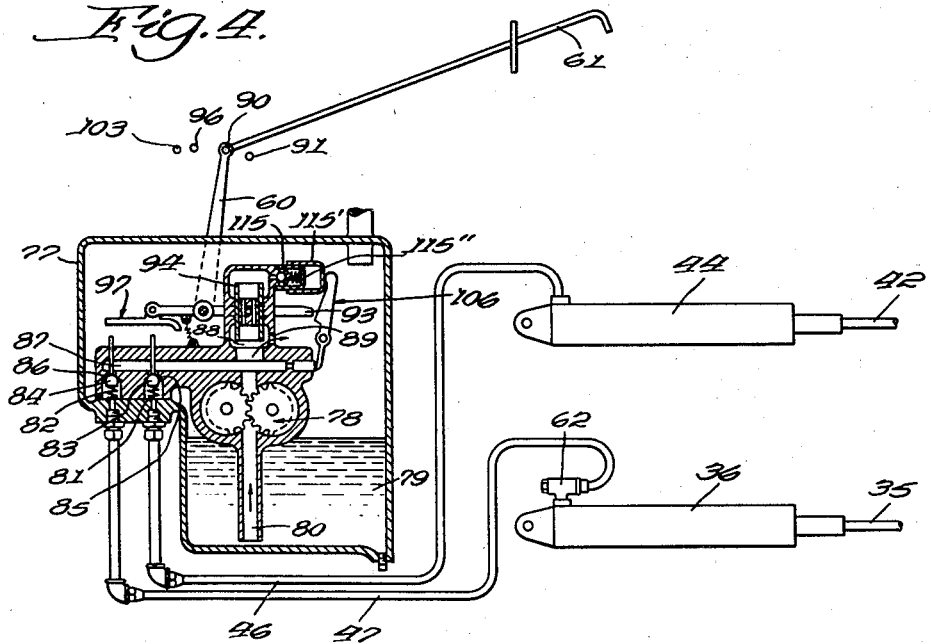
Figure 4 is a sectional view of the hydraulic mechanism employed in association with this corn harvester and shown in neutral position.

The reference numeral 10 indicates generally an agricultural tractor of the type having a narrow longitudinal body portion 11, a front tricycle wheel 12, and relatively widely spaced rear traction wheels 13. The corn picker of this invention is shown mounted directly on the tractor 10. One of the large traction wheels 13 has been removed from Figure 1 to show the power lift mechanism positioned beneath the longitudinal body portion 11 of the tractor 10. The rear wheels 13 are mounted on an axle 14 having a surrounding housing 15. A supporting bracket 16 depends from the axle housing 15 and carries a draw-bar structure 17.

Corn picker gathering units 18 are positioned over the rear axle housing 15 and extend downwardly and forwardly between the outer rear wheel 13 and the elongated body portion 11. The gathering units 18 are equipped with forwardly extending gathering points 19 which terminate closely adjacent the front tricycle or dirigible wheel 12.

The gathering units 18 house snapping and husking rolls (not shown) and are equipped with a discharge opening 20 immediately above a hopper 21 carried above the draw-bar structure 17. The hopper 21 feeds ears of corn downwardly into a wagon elevator 22 which is adapted to carry ears of corn upwardly and rearwardly to a discharge spout 23 above a trailing wagon 24. The trailing wagon 24 is generally of the four-wheel type. A portion of the forward wheels 25 is shown in Figure 1. These forward wheels are mounted on a truck capable of being turned by a forwardly extending pole or tongue 26 which is attached to the draw-bar structure 17 at 27 by a pin 28.

The gathering units 18 are generally duplicated on each side of the tractor so that the machine of this disclosure will pick two rows of corn at the same time. The gathering units 18 on each side of the tractor body 11 are joined by a cross-bar 29. A lifting of this cross-bar 29 will cause a simultaneous lifting of both of the gathering units 18, such lifting occasioned in the present machine by hydraulic mechanism. Brackets 30 rigidly fastened to the tractor body 11 at 31 depend downwardly from each side of the tractor body and, as best shown in Figure 2, at their lower ends journally support a shaft 32. The shaft 32 projects beyond the depending arms 30 and at the outer ends thereof has depending brackets 33 fixed thereto so that rotation of the shaft 32 will cause concurrent rotation of the depending arms or brackets 33. Another depending arm 34 is fixed to the shaft 32 at a point just inside one of the outer brackets 30 and is joined at its lower end by a forwardly extending piston rod 35 from a hydraulically operated cylinder 36. This cylinder 36 is pivotally attached to the tractor body 11 through the medium of a depending arm 37 at 38.

Figure 7:
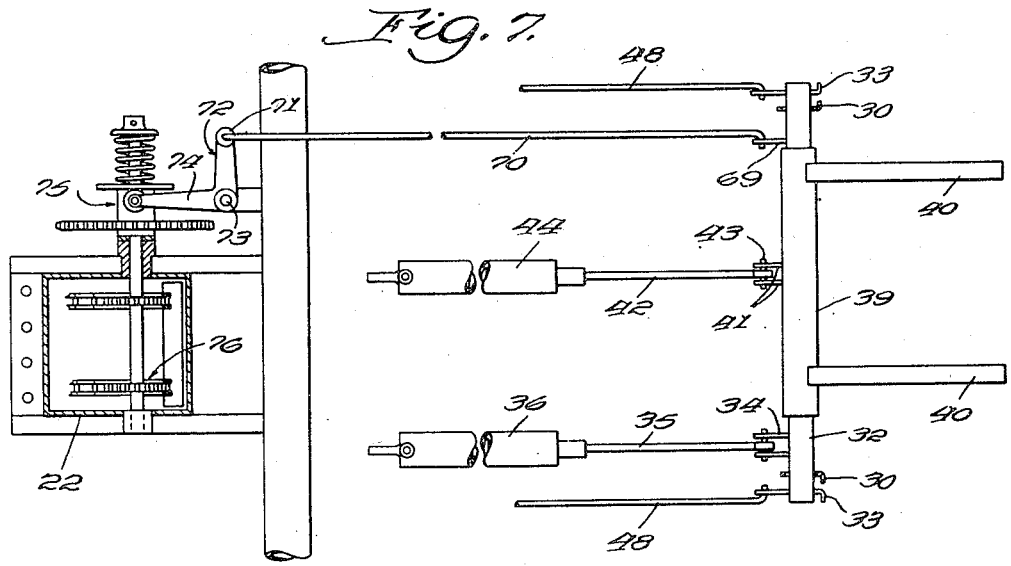
Figure 7 is a fragmentary top plan view of the hydraulic cylinder connections similar to that shown in Figure 2.

Another arm 69 is attached to and depends from the shaft 32 as shown in Figures 2 and 7. A connecting link 70 joins the lower end of the arm with one end 71 of a bell-crank 72. The bell-crank 72 is pivoted at 73 and has its other arm 74 adapted to effect engagement or disengagement of a clutch mechanism 75 which acts to operate the elevating conveyor 76 within the wagon elevator 22. Therefore as the shaft 32 rotates to lift the wagon elevator 22 through the links 33, 48, and 53, the conveying mechanism within the elevator is simultaneously disengaged.

A sleeve 39 is journally supported on and around the shaft 32 and carries two forwardly extending arms 40 which act directly against the cross-shaft 29 to cause lifting of the gathering units 18. Depending arms 41 are rigidly attached to the sleeve member 39 and at their lower ends join with a forwardly extending piston rod 42 at 43. The piston rod 42 projects forwardly from a second hydraulic cylinder 44 which is pivotally attached to the tractor body 11 at 45, as best shown in Figure 1.

Figure 5:
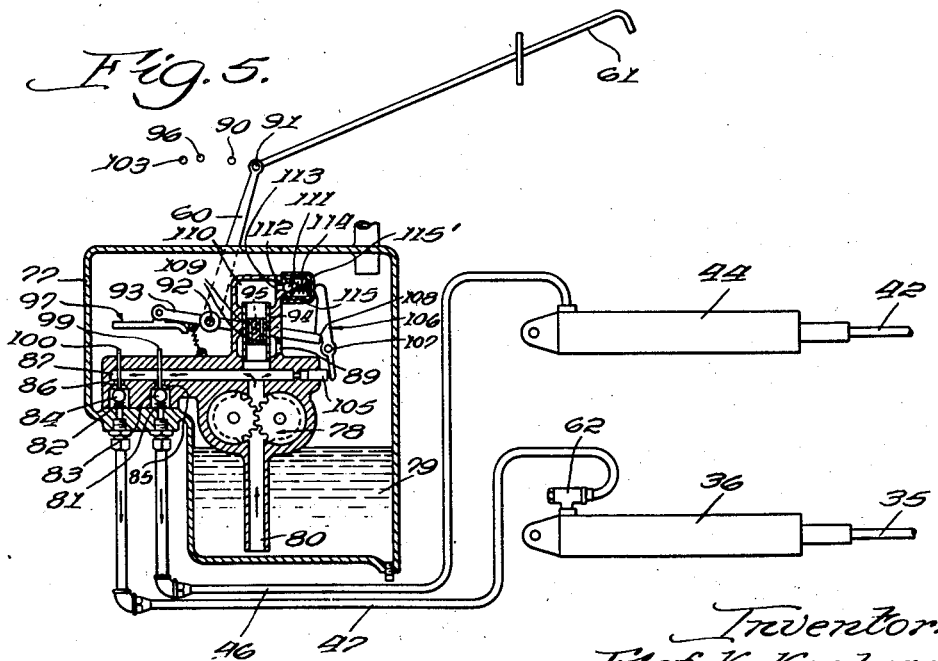
Figure 5 is a view of the hydraulic mechanism similar to Figure 4 shown in implement raising position.
Figure 6:
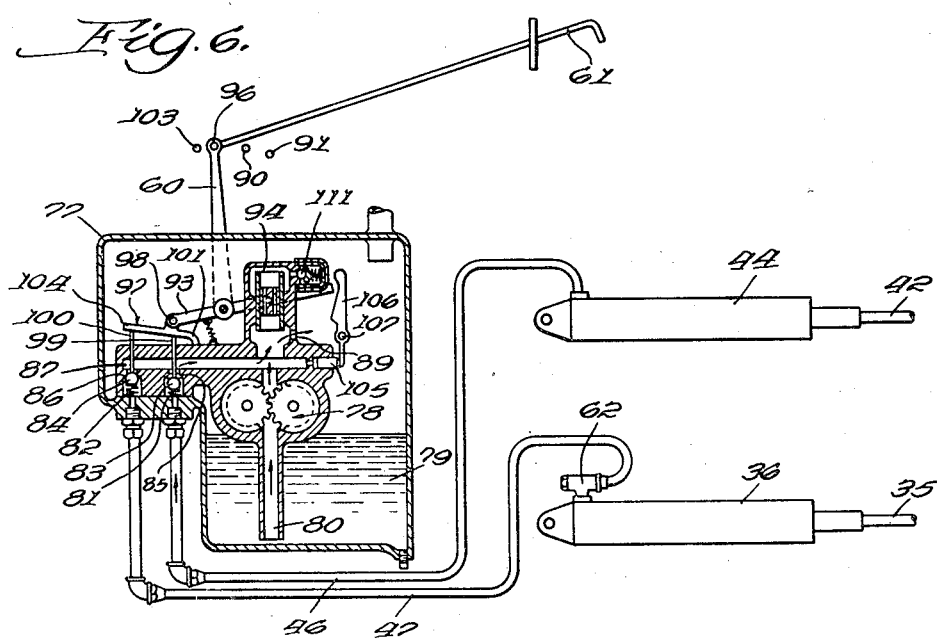
Figure 6 is another view of the hydraulic mechanism similar to Figures 4 and 5 and shown in implement lowering position.

The tractor is equipped with a hydraulic apparatus as shown in Figures 4, 5, and 6. The hydraulic apparatus is actuated by a single control lever 60 moved by a handle 61 positioned in close proximity to the operator of the tractor. The hydraulic apparatus consists of a housing 77 within which is mounted a pump 78. The lower portion of the housing 77 acts as a reservoir for a supply of hydraulic fluid 79. A conduit 80 projects down within the fluid 79 and leads directly to the rotor type fluid pump 78. Discharge conduits 46 and 47 join the hydraulic apparatus housing 77 with the cylinders 44 and 36 respectively.

As shown in Figure 4, the hydraulic apparatus, as indicated by the single operating lever 60, is in neutral position. In neutral position the conduits 46 and 47 are closed by reason of the springs 81 and 82 maintaining the ball valves 83 and 84, respectively, in closed relationship with respect to the valve seats 85 and 86. Passage of fluid from the reservoir to the cylinders 36 and 44 is thus prevented. Further return of fluid from the cylinders 36 and 44 to the reservoir 79 is also prohibited by reason of the closed valve. The rotor pump 78 is in constant operation and as a result fluid from the reservoir 79 is carried upwardly through the conduit 80 to be under pressure to the pump 78 and carried past the transverse conduit 87 up through the conduit 88 and out the port 89 where the fluid drops back into the reservoir 79. In neutral position, therefore, the fluid is merely pumped in a circle without doing any work. As shown in Figure 5, the handle 61 has been pulled rearwardly toward the operator of the tractor so that the control lever 60 has been moved from the point 90 to the point 91. The control lever 60 is pivoted for arcuate movement about the pin 92. The lever 60 carries an arm 93 at substantially right angles thereto. Movement of the control lever 60 from the neutral position, as shown in Figure 4 wherein the arm 93 is horizontally level to the position of Figure 5, causes the arm 93 to be rotated and thus assume an inclined position. A sleeve valve 94 is attached to the arm 93 by a pin 95. As a result, the sleeve valve 94 has been lowered from an inoperative position to the position shown in Figure 5, wherein the exit port 89 has been closed. The closing of the opening 89 diverts the fluid previously passing therethrough through the transverse conduit 87 to the discharge ports 85 and 86 which are closed by the ball members 83 and 84. The pump 78 puts the fluid under sufficient pressure to overcome the action of the springs 81 and 82, thus causing the balls 83 and 84 to be moved downwardly, compressing the springs 81 and 82, respectively, and permitting passage of fluid through the conduits 46 and 47. The fluid passes immediately to the hydraulic cylinder 44 which has its piston 42 extended, effecting a raising of the gathering units 18 of this corn harvester. The two cylinders 44 and 36 are arranged with a fixed pressure releasing valve 62 so that the cylinder 44 will operate with the least amount of fluid pressure and hence will operate first. The hydraulic mechanism is capable of supplying fluid under pressure to operate both cylinders either singly or simultaneously. However, the fixed pressure releasing valve 62, as best shown in Figure 3, insures that the force required to operate the cylinder 44 is less than that required to operate the cylinder 36. The hydraulic cylinder 44 will actuate first and when the piston 42 of the cylinder 44 reaches its extended position the fluid under pressure in the hydraulic mechanism will cause the valve 62 to open, thus admitting fluid to the cylinder 36. The valve 62 has an inlet port 63 and a valve plunger 64 yieldably forced against a seat 65 by a spring 66. When the fluid under pressure in the conduit 47 becomes greater than the force of the spring 66, the valve 64 opens, permitting fluid to move therepast and out the outlet 67. A ball 68 is arranged in the valve plunger 64 to permit return of fluid to the reservoir 79. Extension of the piston 35 will cause the depending arms 33 and 69 to move in a counterclockwise direction as viewed in Figure 2.

The lower ends of the depending arms 33 are joined with downwardly and forwardly extending links 48 which at their upper ends are joined at 49 to a triangular plate member 50 which is pivoted at 51 to an upwardly extending post 52 carried by the rear axle housing 15 as best shown in Figure 1. A second link 53 joins the forward and upwardly extending apex 54 of the triangular plate 50 at 55. Upon a forward and downward movement of the link 48 caused by counterclockwise movement of the depending arms 33, the triangular plate 50 will rotate about its pivot 51 and will in turn pull forwardly and upwardly on the rearwardly extending link 53. This rearwardly extending link is attached at 56 to the upper portion of the wagon elevator 22.

The lower end of the wagon elevator 22 is pivoted at 57 to the draw-bar structure 17 and is capable of slight hinging movement during all operations of the corn picker. When the cylinder 35 is extended forwardly the wagon elevator 22 will be raised upwardly about its hinge 57.

In lowering the gathering points and the elevator the handle 61 on the control lever 60 is initially moved forwardly from its position as shown in Figure 5 to the position as shown in Figure 6 where the lever 60 is shown positioned adjacent the point 96. In this position of the lever 60 the cross arm 93 has its forward end inclined downwardly. A valve actuating member 97 is pivoted at 98 to the forward end of the arm 93. Each of the ball valves 83 and 84 have integral upwardly extending rod-like elements 99 and 100 respectively. The valve actuating member 97 has a heel portion 101 adapted to be fulcrumed on the surface of the inner housing 102 carrying the rotor pump 78, the several fluid passages, and also the valve members 83 and 84. In the position as shown in Figure 6, the valve actuating member 97 has contacted and pushed downwardly the upwardly extending rod 99 from the ball valve 83. This downward movement of the valve 83 has caused the valve to leave its seat 85, thus permitting fluid to return from the cylinder 44 to the reservoir 79. The pump 78 continues operation uninterruptedly but in the position of the control lever 60 as shown in Figure 6, the sleeve valve 94 is raised to a position where the port 89 is opened. In view of this fact, the pump no longer supplies fluid under pressure for the cylinders 36 and 44 and when the valves 83 and 84 or either of them are opened, the fluid in the cylinders is permitted to come back to the reservoir to the conduit 87, upwardly and out through the port 89, and thence back to the reservoir 79. After the cylinder 44 has been relieved of its fluid under pressure and the gathering points of the corn harvester are lowered to operating position, it is then the proper time to lower the wagon elevator and resume operation of its conveyor. To effect such operation the control lever 60 is moved forwardly to the point 103, and it will be obvious that such movement causes the forward or toe-end 104 of the valve actuating member 97 to move downwardly, causing the valve 84 to open and permit fluid under pressure to exhaust back to the reservoir 79 from the cylinder 36. It will thus be seen that the delayed action in reverse order is accomplished on movement of the elements down to corn harvesting and wagon loading positions.

In the raising of the gathering points and the wagon elevator the control lever 60 is moved from the point 90 to the point 91. As previously described, the valves 83 and 84 are forced open, causing the cylinders 36 and 44 to receive fluid under pressure from the pump 78. Initial pulling of the handle 61 causes an immediate extension of a small piston 105 at the end of the conduit 87 opposite the end having the valves 83 and 84. Extension of this piston 105 causes a pivotal rotation of a lock member 106 which is pivoted at 107. The lock member 106 has a ledge portion 108 adapted to hook over the end of the cross-arm 93. Such action eliminates the necessity of holding the hand lever in a rearward position to effect raising of the movement and therefore cylinders 36 and 44 are completely extended while the lock member 106 holds the control lever 60 during raising position. After the cylinders 36 and 44 have had their respective pistons fully extended, fluid from the pump 78 can no longer continue through the valves 83 and 84 but must find another outlet. Bleed lines 109 are provided in the sleeve valve 94 to permit slow passage of fluid to an upper chamber 110. A ball valve 111 is spring-held against a seat 112 formed in the port 113 in the chamber 110. The spring 114 contacts the ball 111 at its one end and is held within a fixed cap member 115 at its other end. An outer cap 115' contacts the upper portion of the pivotable lock member 106. Thus after the hydraulic cylinders 36 and 44 are filled, the chamber 110 is filled by a bleeding of the fluid under pressure through the passages 109 and when the fluid under pressure in this chamber 110 becomes sufficiently great to force the ball valve 111 from its seat 112, the fluid passes through an aperture 115" in the cap 115 thus pushing the slidable cap or piston 115' outwardly and causing clockwise rotation of the lock member 106 about its pivot 107 and a resultant releasing of the ledge 108 from its holding position with respect to the cross-arm 93. The control lever 60 immediately jumps back to its neutral position designated by the point 90. The position of the elements is then identical to that shown in Figure 4. The ball valves 83 and 84 are in effect check valves and prevent withdrawal of fluid from the cylinders 36 and 44. In the exhausting of fluid from cylinders 36 and 44 the lock member 106 does not function.

As stated in the objects above, it is the main purpose of this invention to cause the wagon elevator 22 to be lifted immediately after the gathering points 19 are lifted so as to prevent contact of the under side of the wagon elevator 22 at 58 with the upper forward edge 59 of the trailing wagon 24. When the corn picker passes over a ditch, it is necessary to raise the gathering points 19 so that these points will not dig into the far side of the ditch. After the points have been raised and the forward portion of the tractor 10 has passed over the ditch, the rear traction wheels 13 of the tractor will then go down into the ditch, causing the upwardly and rearwardly extending wagon elevator to be lowered so that if precautions were not taken to prevent the elevator's contact with the wagon, such contact would occur. The controls for the hydraulic cylinders 36 and 44 are joined together so that one may not be operated separately from the other. Immediately following extension of the piston 42 from the cylinder 44, piston 35 begins to move forwardly, and as a result thereof immediately following the raising of the gathering points 19, the wagon elevator 22 is raised upwardly and forwardly about its hinge 57 to a point where its under side 58 will clear the upward and forward edge of the trailing wagon 24.

Numerous details of construction may be varied throughout a wide range without departing from the principles disclosed herein, and we therefore do not propose limiting the patent granted hereon otherwise than as necessitated by the appended claims.

What is claimed is:

1. In a harvester and trailing wagon, said harvester having vertically adjustable gathering units at the forward end thereof and a vertically adjustable elevator for delivering harvested material to the trailing wagon, including separate hydraulic units for raising said gathering units and said elevator respectively, said separate hydraulic units having a combined single manually operable control for delivering fluid under pressure thereto, and means associated with the hydraulic units for causing them to operate at different pressures.

2. In a harvester and trailing wagon, said harvester having vertically adjustable gathering units at the forward end thereof and a vertically adjustable elevator for delivering harvested material to the trailing wagon, including separate hydraulic units for raising said gathering units and said elevator respectively, said separate hydraulic units having a combined single manually operable control for delivering fluid under pressure thereto, and means associated with the hydraulic unit for raising the elevator to cause it to operate at a higher pressure, said means including a fluid operated pressure releasing valve, whereby the gathering units are initially raised and as they reach the upper end of their travel the fluid operated pressure releasing valve is overcome and the wagon elevator is raised.

3. In a harvester and trailing wagon, said harvester having vertically adjustable gathering units at the forward end thereof and a vertically adjustable elevator for delivering harvested material to the trailing wagon, including separate hydraulic units for raising said gathering units and said elevator respectively, said separate hydraulic units having a combined single manually operable control for simultaneously delivering fluid under pressure thereto, and valve means associated with one of said hydraulic units adapted to resist passage of fluid therepast until a predetermined pressure has been attained in the fluid.

4. In a harvester and trailing wagon, said harvester having vertically adjustable gathering units at the forward end thereof and a vertically adjustable elevator for delivering harvested material to the trailing wagon, comprising separate hydraulic units for raising said gathering units and said elevator respectively, said separate hydraulic units having a combined single manually operable control for simultaneously delivering fluid under pressure thereto, and valve means associated with the hydraulic unit for raising said elevator to resist passage of fluid until the fluid has attained a predetermined minimum pressure, whereby the gathering units will be raised prior to the raising of the elevator.

5. In combination, a tractor-mounted harvester having vertically adjustable crop gathering means and a vertically adjustable wagon elevator to discharge gathered crops into a wagon moved with the tractor, said wagon elevator having a conveyor driven by said tractor, a clutch and actuator therefor intermediate said conveyor and said tractor, means to lift the gathering means and elevator successively and to automatically declutch said clutch upon the raising of the elevator, comprising a single manually operable actuating element, a lifting means connected to each of the crop gathering means and the wagon elevator, connecting means joining said clutch actuator with the lifting means connected to the wagon elevator, and means associated with the lifting means connected to the wagon elevator to delay its action until such time as the lifting means connected to the crop gathering means has operated.

6. In a harvester and trailing wagon, said harvester having vertically adjustable gathering units at the forward end thereof and a vertically adjustable elevator having a declutchable driven conveyor for delivering harvested material to the trailing wagon, comprising hydraulic means for raising said gathering units and elevator and declutching said driven conveyor in succession in that order, and further means for lowering said gathering units and elevator and reclutching said driven conveyor in succession in that order.

7. In combination, a tractor-mounted harvester having vertically adjustable crop gathering means and a vertically adjustable wagon elevator to discharge gathered crops into a wagon moved with the tractor, said wagon elevator having a conveyor driven by said tractor, a clutch intermediate said conveyor and said tractor, comprising a single manually initiated, tractor actuated means to lift the gathering means and elevator successively and to automatically declutch said clutch upon the raising of the elevator, and further manually initiated, tractor actuated means to lower said gathering means prior to lowering the elevator and reengaging the clutch for said wagon elevator conveyor.

ELOF K. KARLSSON.
ARTHUR H. KELLER.

REFERENCES CITED

The following references are of record in the file of this patent:

UNITED STATES PATENTS

| Number | Name | Date |
|---|---|---|
| 1,852,314 | Krieg | Apr. 5, 1932 |
| 2,325,870 | Mott | Aug. 3, 1943 |
| 2,402,449 | Rockwell | June 18, 1946 |
| 2,409,509 | Mott | Oct. 15, 1946 |
| 2,416,373 | Brown | Feb. 25, 1947 |